United States Patent Office

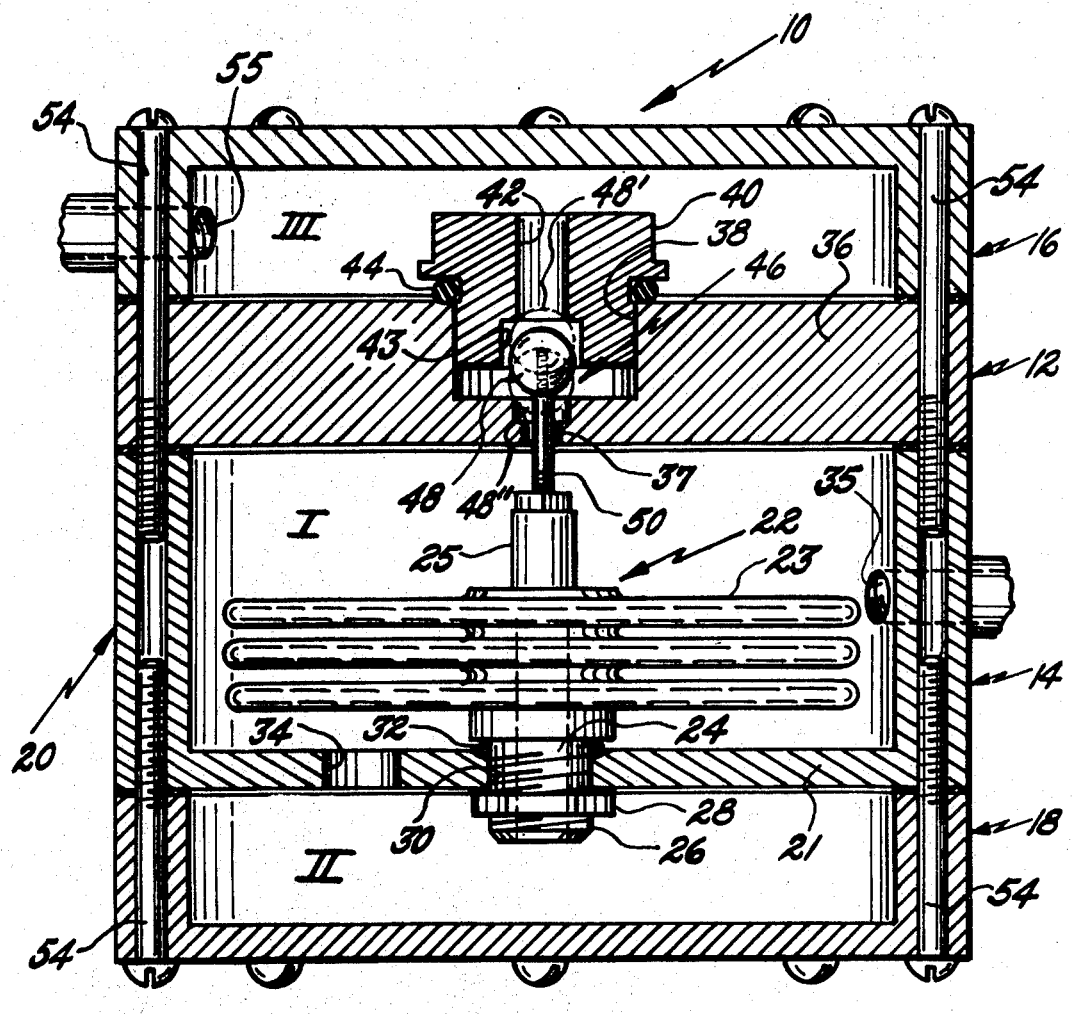

3,529,623
Patented Sept. 22, 1970

3,529,623
AUTOMATIC FLOW CONTROL VALVE ASSEMBLY
Ralph Johnson, Kaysville, Utah, assignor to the United States of America as represented by the Secretary of the Air Force
Filed Aug. 6, 1968, Ser. No. 750,730
Int. Cl. F16k *17/34*
U.S. Cl. 137—497                6 Claims

ABSTRACT OF THE DISCLOSURE

An automatic flow control valve assembly which limits the air flow in instrument lines to a predetermined rate. The pressure changes in the instrument lines produce a flow through a metering orifice which results in differential pressure on a bellows assembly. As the bellows assembly responds to the pressure changes, a valve opens and closes.

BACKGROUND OF THE INVENTION

This invention relates generally to valves and, more particularly, to a valve assembly which automatically limits the air flow through the valve assembly to a predetermined rate.

Although flow control valves have been used for many years, the functional demands placed upon them have been relatively limited until recent years. With more and more emphasis placed upon the aviation industry, the development of pressure activated instruments has vastly increased. These instruments, however, have become more sensitive and therefore more susceptible to damage by the rate of pressure changes which exceeds the capability of the instruments.

It therefore becomes necessary under certain conditions, for example, when utilizing these sensitive instruments, to restrict the rate of change of pressure within the lines to which these instruments are connected. Presently, there are no effective protective devices in use on such instrument lines. Existing devices that have been considered as protective devices were, for example, orifices or flow fuses.

The orifice cannot be used due to the restriction produced in the instrument lines which causes excessive instrument lag in normal operating range. Flow fuses could not be used since they require flow rates and pressures in excess of those produced in vacuum chamber instrument lines under normal operation. Also, a flow fuse will only operate on a system where the flow is in one direction.

SUMMARY OF THE INVENTION

The flow control valve assembly of the instant invention overcomes the problems set forth above and may be of use in any instance in which it becomes necessary to restrict the rate of change of pressure within a line. The instant invention finds its main utility in restricting the rate of change of pressure in the instrument lines on vacuum chambers. The present flow control valve assembly restricts the flow to the instruments when the rate of change of pressure within the line exceeds the capability of the instruments.

More particularly, on altitude training chambers, the rate of pressure change is shown on a vertical speed indicator. On some such instruments, for example, the maximum rate of pressure change that the instrument can absorb without possible damage is 12,000 ft./min.

The flow control valve assembly of the instant invention is installed within such an instrument line and limits the air flow in such a line to a predetermined rate. Pressure changes in the instrument lines produce a flow through a metering orifice which results in differential pressure on a bellows assembly. As this bellows assembly responds to the pressure changes, a valve opens and closes accordingly. The metering orifice controls the flow from a known volume in the valve assembly and not the flow through the valve; therefore, it controls the flow in the line within the limits of a specific instrument independently of the number and type of other instruments used in the system.

It is therefore an object of this invention to provide an automatic flow control valve assembly which controls the flow in an instrument line independent of the number of instruments within the system and regardless of the size and length of the lines.

It is a further object of this invention to provide an automatic flow control valve assembly which does not restrict the flow within the normal operating range of an instrument.

It is another object of this invention to provide an automatic flow control valve assembly which controls excessive flow in both directions.

It is still another object of this invention to provide an automatic flow control valve assembly which senses the rate of change in pressure or flow, not the quantity of flow.

It is still a further object of this invention to provide an automatic flow control valve assembly which utilizes conventional, currently available components that lend themselves to standard mass producing manufacturing techniques.

For a better understanding of the present invention, together with other and further objects thereof, reference is had to the following description taken in connection with the accompanying drawing, and its scope will be pointed out in the appended claims.

DESCRIPTION OF THE DRAWING

The only figure of the drawing represents a cross-sectional side elevation view of the automatic flow control valve assembly of this invention in its open position and wherein the closed positions are shown in phantom.

DESCRIPTION OF THE PREFERRED EMBODIMENT

The automatic flow control valve assembly 10 of this invention is shown in cross-section in the figure of the drawing. The valve assembly 10 is made up of four basic parts: the valve section 12, the bellows section 14, and top and bottom cover portions 16 and 18, respectively. The entire valve assembly 10 may be made of any suitable material such as metal and of any suitable configuration such as the cylindrical shape shown in the drawing.

The bellows section 14 is made up of a hollow casing 20 having a bellows assembly 22. The bellows assembly 22 is composed of a bellows 23 fabricated from any suitable material such as light-weight rubber or brass having a hollow shaft 24 fixedly secured at its lower end by any suitable securing means and a shaft 25 secured to its upper end. At the lower end of hollow shaft 24 is a suitable holding means such as threaded portion 26 which is used to secure the bellows assembly 22 to the bottom portion 21 of the casing 20. The shaft 24 is held securely in place by a nut 28 which is screwed onto threaded portion 26 of shaft 24 after the threaded portion has been inserted into an aperture 30 located within bottom portion 21. In order to prevent leakage any suitable sealing means such as O-ring 32 may be inserted between shaft 24 and the bottom portion 21 of casing 20. The hollow casing 20 further has two orifices located therein, one metering orifice 34, the size of which will be specifically set out hereinbelow located in the bottom portion 21 and the other orifice 35 located in a side wall of the casing. Attached to orifice 35 is a line connecting the valve assembly 10 to any suitable instrument.

The valve section 12 is made up of a body portion 36 having a centrally located recess 38 and aperture 37 therein. Inserted within recess 38 is a plug 40 having a central aperture 42 therein. The plug 40 is fixedly secured by any suitable securing means within the recess 38 and has a suitable seal such as O-ring 44 located between the plug 40 and the body 36. A valve 46 made of ball 48 and stem 50 is located within an enlarged recess 43 within plug 40. The ball 48 is adjustably secured to the upper end of stem 50 by any suitable adjustable securing means such as by screwing it thereon and the stem 50 is fixedly secured to the upper end of shaft 25 of the bellows assembly 22 by any suitable securing means which may also be adjustable if desired. The above-mentioned adjustable securing means is capable of being easily adjusted so as to vary the height of the ball 48 within the enlarged recess 43 of plug 40.

Valve section 12 and bellows section 14 are fastened together in the manner shown in the drawing and are held securely in place by any suitable fastening means such as screws 54 forming a chamber I. Top and bottom cover portions 16 and 18 are also held in position by any suitable securing means such as screws 54 and thereby forming chambers II and III. The cover portions are identical in structure except that top cover portion 16 has an aperture 55 located therein for the purpose of connecting the valve assembly 10 to an inlet line of a pressure actuated instrument.

It is critical that the size of the metering orifice 34 within bottom portion 21 and the volume of the lower chamber II be determined from the following formula for proper operation of the automatic flow control valve assembly 10 of this invention:

$$\omega = \frac{VP_0^{\frac{1}{1+b}}}{RT_0} \left(\frac{b}{1+b}\right) P^{-\frac{1}{1+b}} \frac{dp}{dt}$$

where $\omega$=Flow rate (lb./sec.),
V=Volume of chamber II (ft.$^3$),
$P_o$=Initial pressure (lb./ft.$^2$),
R=Gas constant (53.3 ft. lb./lb. ° R. for air),
$T_o$=Initial temperature (° R.),
b=2.5 for diatomic gas,
p=Final pressure (lb./ft.$^2$),
dp/dt=Rate of pressure change (lb./sec. ft.$^2$)

and $$A = K\frac{\omega}{\gamma}$$

A=Area of orifice 34 (in.$^2$),
$\gamma$=Density of gas (lb./ft.$^3$), and
K=Constant—taken from plots of pressure drop vs. flow for type of porous material used as filter over orifice 34 (ft.$^3$/sec. in.$^2$) if so desired.

MODE OF OPERATION

When the pressure in the altitude training chamber (not shown) or a device to which the automatic flow control valve assembly 10 of this invention is attached increases, air flows into upper chamber III, through the aperture 55. The air then flows through aperture 42 of plug 40, through aperture 37 and out orifice 35 to an instrument (not shown). If the rate of pressure change is low, the metering orifice 34 maintains equal pressure in chambers I and II, thereby exerting no differential pressure on the bellows assembly 22 and the valve 46 remains in the mid position (open). As the rate of pressure change increases, the orifice 34 cannot maintain equilibrium between chambers I and II and the pressure in chamber I exceeds that in chamber II. This causes the bellows assembly 22 to retract and the valve 46 restricts the flow through the aperture 37 (shown in phantom with the ball represented by 48″). In other words, when the rate of pressure change exceeds a predetermined rate (for example, 12,000 ft./min.) the differential pressure between chambers I and II causes the bellows assembly 22 to close the valve 46. Then as the orifice 34 attempts to equalize the pressure between chambers I and II, the valve 46 will cycle open and shut allowing the rate of pressure change sensed by the instrument to remain below the predetermined rate (that is, 12,000 ft./min.). When pressure in the altitude training chamber decreases, the valve assembly works in a similar manner as set forth above except that the differential pressure between chambers I and II causes the bellows assembly 22 to expand and thereby forcing valve 46 upward so as to restrict the flow through orifice 42 (shown in phantom with the ball represented by 48′).

Although the invention has been described with reference to a particular embodiment, it will be understood to those skilled in the art that the invention is capable of a variety of alternative embodiments within the spirit and scope of the appended claims.

I claim:

1. An automatic flow control valve assembly comprising a valve section, a bellows section mounted on said valve section forming a first chamber, a bottom cover portion mounted on said bellows section forming a second chamber, a top cover portion mounted on said valve section forming a third chamber, said bellows section having a casing, a bellows assembly attached to the bottom portion of said casing and located within said first chamber, means communicating the interior of said bellows with said second chamber, a first metering orifice in said bottom portion of said casing, a second orifice in a side portion of said casing, said valve section having a central passage with an intermediate enlargement having oppositely facing upstream and downstream valve seats, a three-position valve in said intermediate enlargement, said valve being secured at one end to said bellows assembly so that when pressures inside and outside said bellows are equalized said bellows biases said valve to a position out of contact with said downstream valve seat, said top cover having an inlet therein whereby fluid enters said inlet, flows through said central passage into said first chamber when said valve is in the open position, then simultaneously flows out said second orifice and through said first orifice into said second chamber thereby regulating the position of said valve by the fluid pressure change upon said bellows assembly.

2. An automatic flow control valve assembly as defined in claim 1 wherein said valve is adjustable.

3. An automatic flow control valve assembly as defined in claim 2 wherein the area of said first orifice is determined by:

$$A = \frac{\omega}{\gamma}$$

where

A=area of said first orifice (in.$^2$),
$\gamma$=density of fluid (lb./ft.$^3$), and
$\omega$=flow rate (lb./sec.).

4. An automatic flow control valve assembly as defined in claim 3 wherein said flow rate ($\omega$) is determined by:

$$\omega = \frac{VP_o^{\frac{1}{1+b}}}{RT_o} \left(\frac{b}{1+b}\right) P^{-\frac{1}{1+b}} \frac{dp}{dt}$$

where $\omega$=flow rate (lb./sec.),
V=volume of said second chamber (ft.$^3$),
$P_o$=initial pressure (lb./ft.$^3$),
R=fluid constant (53.3 ft. lb./lb. ° R. for air),
$T_o$=initial temperature (° R.),
b=2.5 for diatomic gas,
p=final pressure (lb./ft.$^2$), and
dp/dt=rate of pressure change (lb./sec. ft.$^2$).

5. An automatic flow control valve assembly as defined in claim 1 wherein the area of said first orifice is determined by:

$$A = \frac{\omega}{\gamma}$$

where

A = area of said first orifice (in.$^2$),
$\gamma$ = density of fluid (lb./ft.$^3$), and
$\omega$ = flow rate (lb./sec.).

6. An automatic flow control valve assembly as defined in claim 5 wherein said flow rate ($\omega$) is determined by:

$$\omega = \frac{VP_o^{\frac{1}{1+b}}}{RT_o}\left(\frac{b}{1+b}\right)P^{-\frac{1}{1+b}}\frac{dp}{dt}$$

where $\omega$ = flow rate (lb./sec.),
V = volume of said second chamber (ft.$^3$),
$P_o$ = initial pressure (lb./ft.$^3$),
R = fluid constant (53.3 ft. lb./lb. ° R. for air),
$T_o$ = initial temperature (° R.),
b = 2.5 for diatomic gas,
p = final pressure (lb./ft.$^2$), and
dp/dt = rate of pressure change (lb./sec. ft.$^2$).

References Cited

UNITED STATES PATENTS

| | | | |
|---|---|---|---|
| 1,702,186 | 2/1929 | Wilson | 137—500 XR |
| 2,245,454 | 6/1941 | Baker | 137—500 XR |
| 2,514,514 | 7/1950 | Puster | 137—501 |
| 2,516,333 | 7/1950 | Moore | 137—501 XR |
| 2,674,847 | 4/1954 | Davies et al. | 137—501 XR |
| 2,704,552 | 3/1955 | De Verteuil | 137—498 |
| 2,704,553 | 3/1955 | De Verteuil | 137—498 |
| 2,705,046 | 3/1955 | Schroeder | 137—501 XR |

M. CARY NELSON, Primary Examiner
R. J. MILLER, Assistant Examiner